(12) United States Patent
Tsubouchi et al.

(10) Patent No.: US 12,235,009 B2
(45) Date of Patent: Feb. 25, 2025

(54) AIR-CONDITIONING SYSTEM AND AIR-CONDITIONING SYSTEM CONTROLLER

(71) Applicant: Panasonic Intellectual Property Management Co., Ltd., Osaka (JP)

(72) Inventors: Masafumi Tsubouchi, Aichi (JP); Ayumi Konishi, Aichi (JP); Naoyuki Funada, Aichi (JP); Takuma Aramaki, Aichi (JP); Takaaki Nakasone, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 392 days.

(21) Appl. No.: 17/797,752

(22) PCT Filed: Dec. 17, 2020

(86) PCT No.: PCT/JP2020/047199
§ 371 (c)(1),
(2) Date: Aug. 5, 2022

(87) PCT Pub. No.: WO2021/166405
PCT Pub. Date: Aug. 26, 2021

(65) Prior Publication Data
US 2023/0082958 A1 Mar. 16, 2023

(30) Foreign Application Priority Data
Feb. 20, 2020 (JP) ................... 2020-026725

(51) Int. Cl.
*F24F 11/74* (2018.01)
*F24F 11/00* (2018.01)
(Continued)

(52) U.S. Cl.
CPC .......... *F24F 11/74* (2018.01); *F24F 11/0008* (2013.01); *F24F 3/001* (2013.01);
(Continued)

(58) Field of Classification Search
CPC .... F24F 11/74; F24F 11/0008; F24F 2110/20; F24F 3/001; F24F 2003/003; F24F 2003/005; G05B 2219/2614
See application file for complete search history.

(56) References Cited

U.S. PATENT DOCUMENTS

| 2015/0267926 A1* | 9/2015 | Matsubara | F24F 3/044 |
| | | | 165/214 |
| 2020/0292198 A1 | 9/2020 | Funada et al. | |

FOREIGN PATENT DOCUMENTS

| JP | 2004-012006 A | 1/2004 |
| JP | 2004-028421 A | 1/2004 |

(Continued)

OTHER PUBLICATIONS

International Search Report for corresponding Application No. PCT/JP2020/047199, mailed Feb. 9, 2021.

*Primary Examiner* — Michael W Choi
(74) *Attorney, Agent, or Firm* — Renner, Otto, Boisselle & Sklar, LLP

(57) ABSTRACT

An air-conditioning system includes a humidifier, a dehumidifier, transfer fans for transferring air of an air-conditioned room to a room, a damper for independently controlling an air volume transferred to the room, a system controller for controlling the humidifier, the dehumidifier and the damper, a room humidity sensor and an air-conditioned room humidity sensor. The system controller further includes an air-conditioned room humidity controller for maintaining the humidity of the air-conditioned room within a specified humidity range defined by a minimum humidity and a maximum humidity, an air volume determiner for (Continued)

determining an air volume passing through the damper according to the humidity of the room obtained by the room humidity sensor and the humidity of the air-conditioned room obtained by the air-conditioned room humidity sensor and a damper controller for controlling the air volume transferred to the room passing through the damper.

16 Claims, 12 Drawing Sheets

(51) Int. Cl.
    *F24F 3/00*         (2006.01)
    *F24F 110/20*     (2018.01)

(52) U.S. Cl.
    CPC ... *F24F 2003/003* (2013.01); *F24F 2003/005* (2013.01); *F24F 2110/20* (2018.01); *G05B 2219/2614* (2013.01)

(56) References Cited

FOREIGN PATENT DOCUMENTS

| JP | 2013-217620 A | | 10/2013 |
|----|---------------|---|---------|
| JP | 2017101861 A | * | 6/2017 |
| WO | 2019/107163 A1 | | 6/2019 |

* cited by examiner

[Fig. 1]
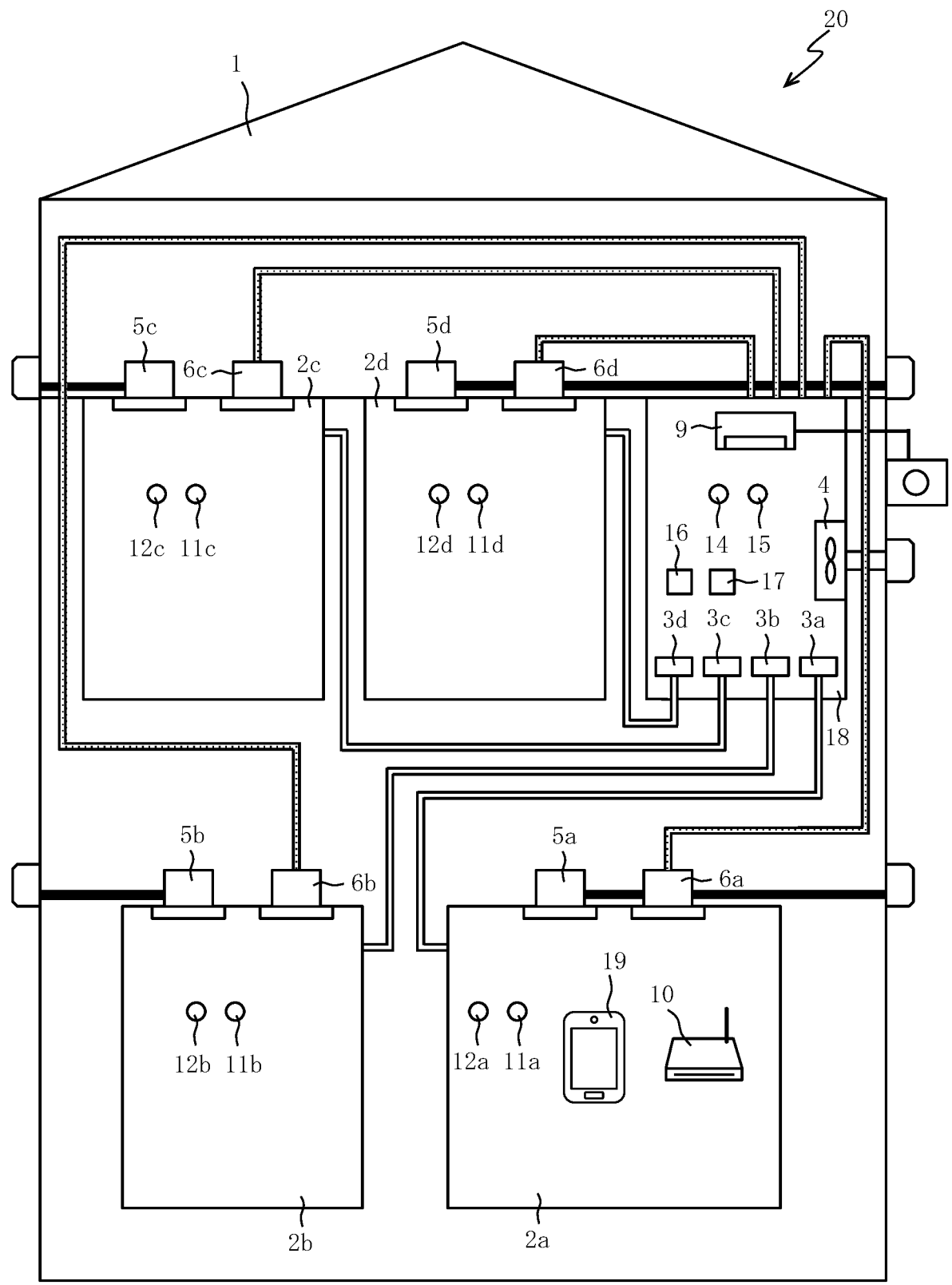

[Fig. 2]
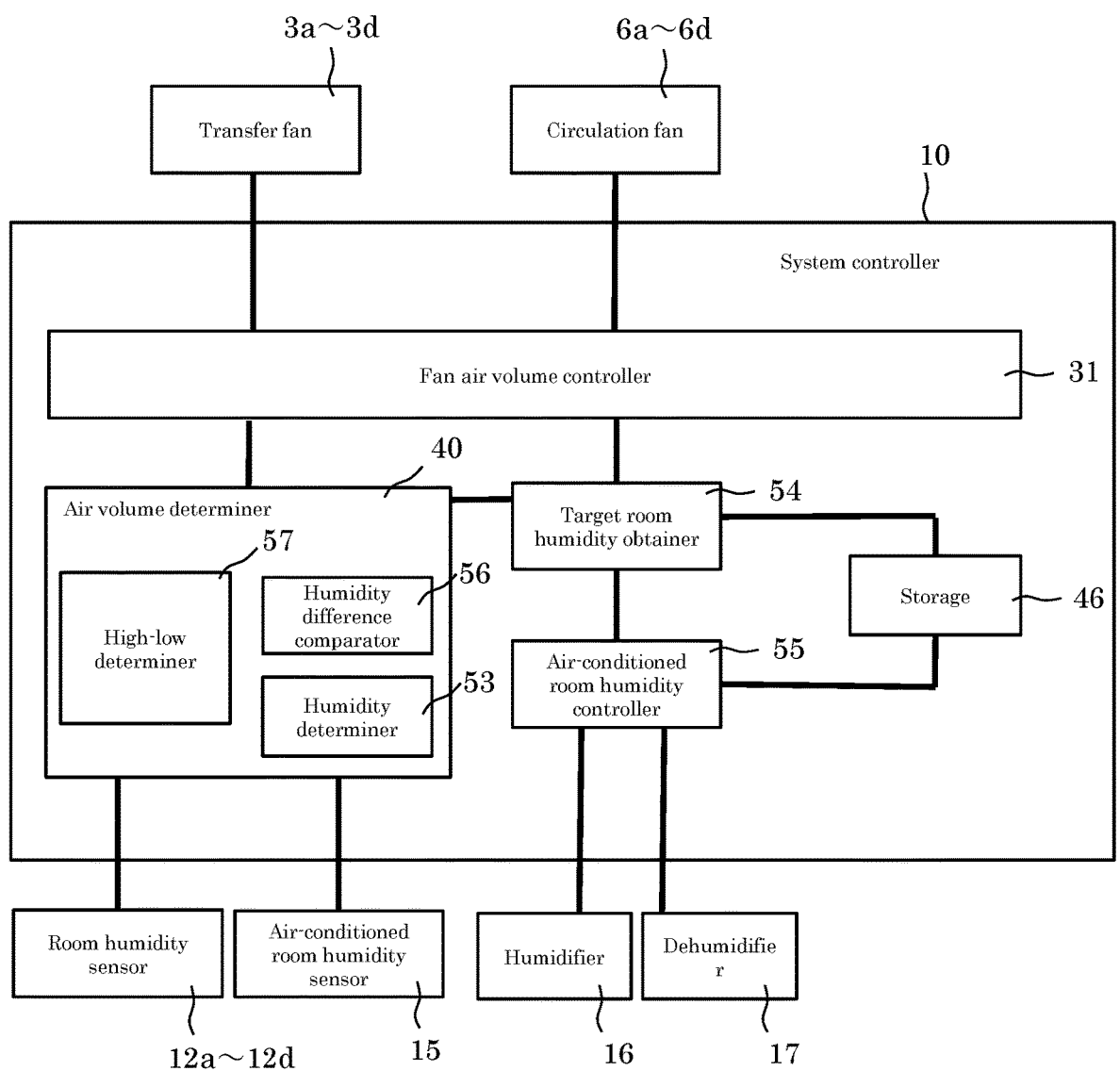

[Fig. 3]
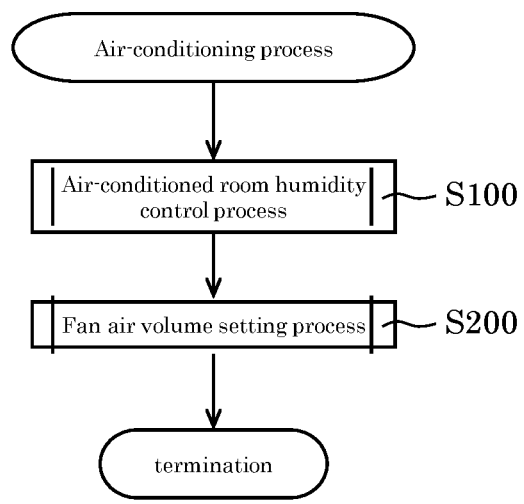
[Fig. 4]
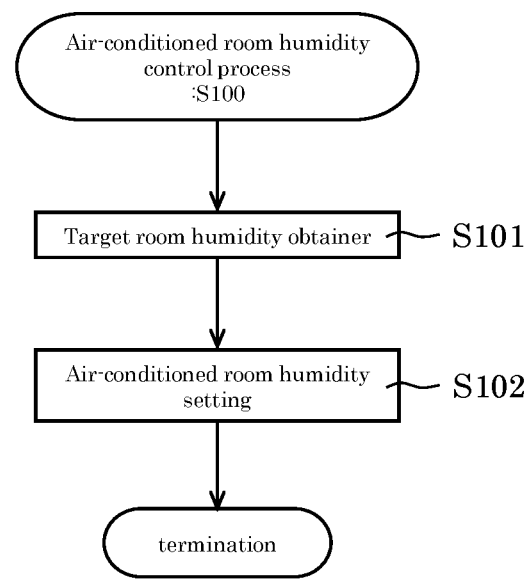

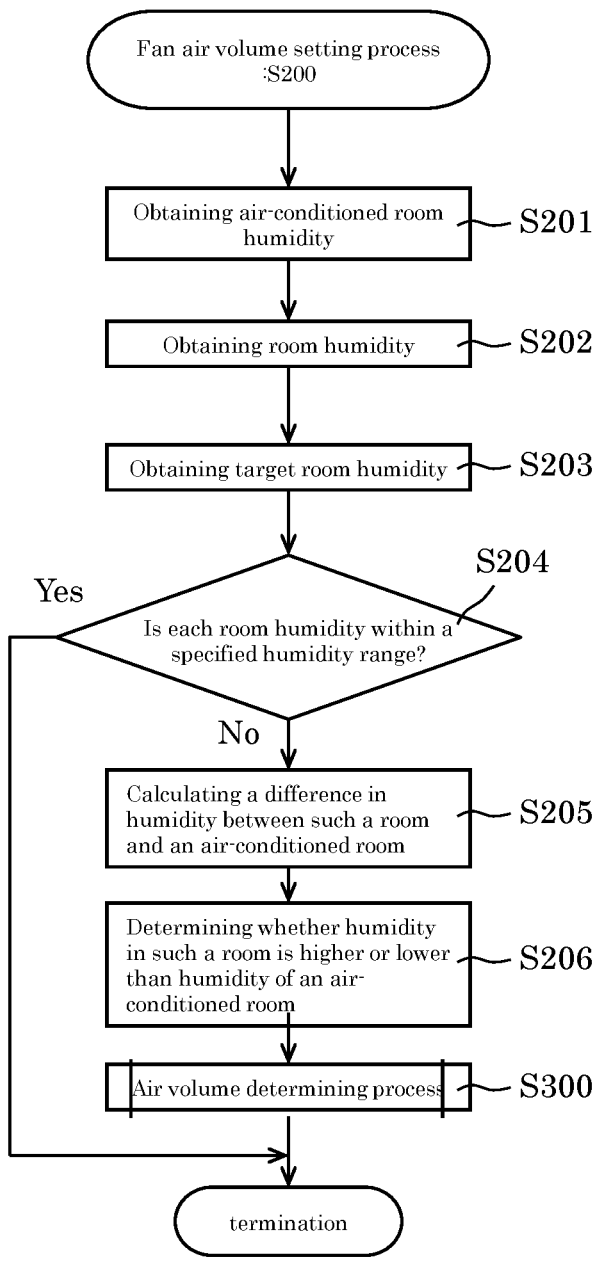
[Fig. 5]

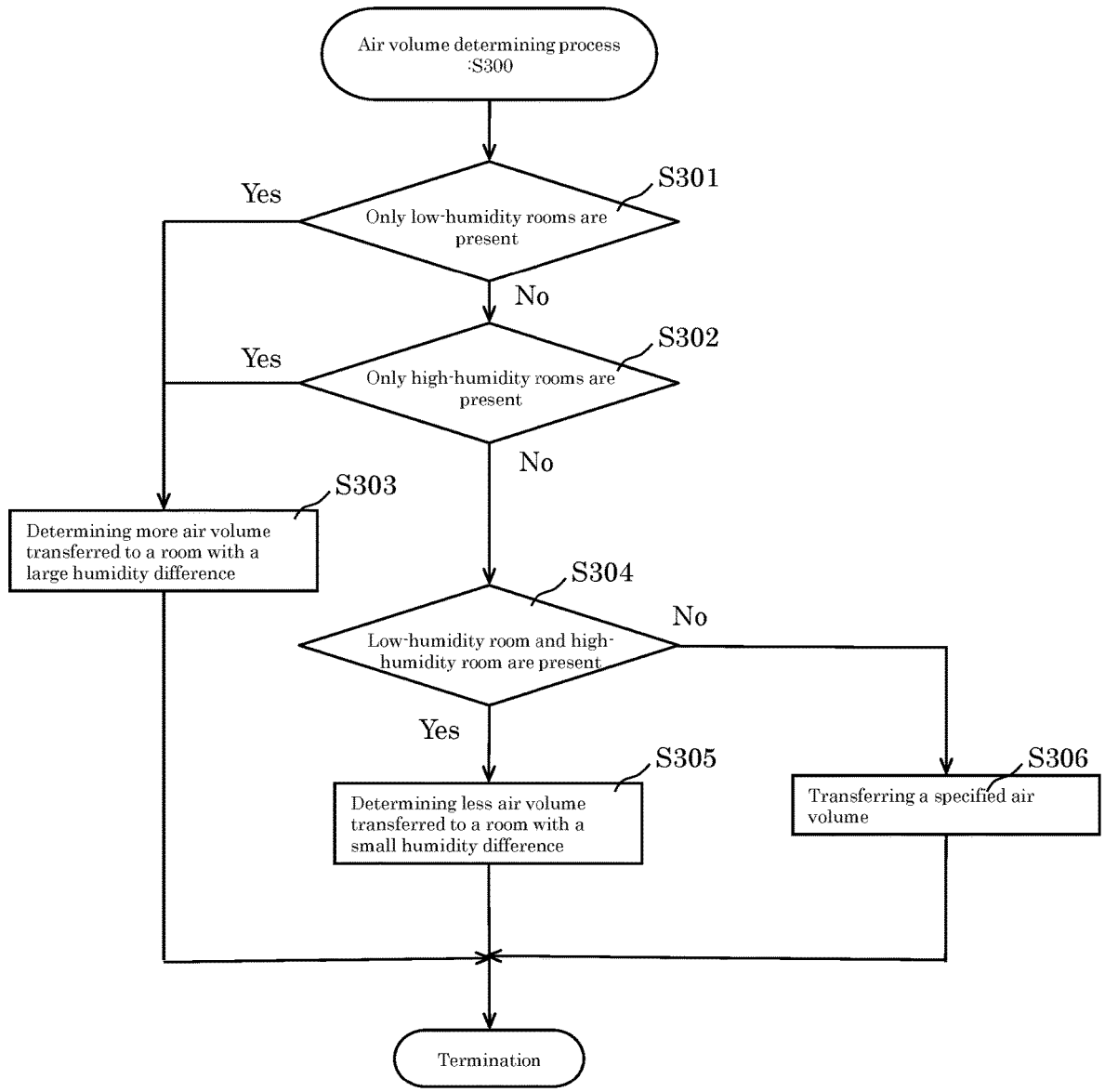

[Fig. 7A]
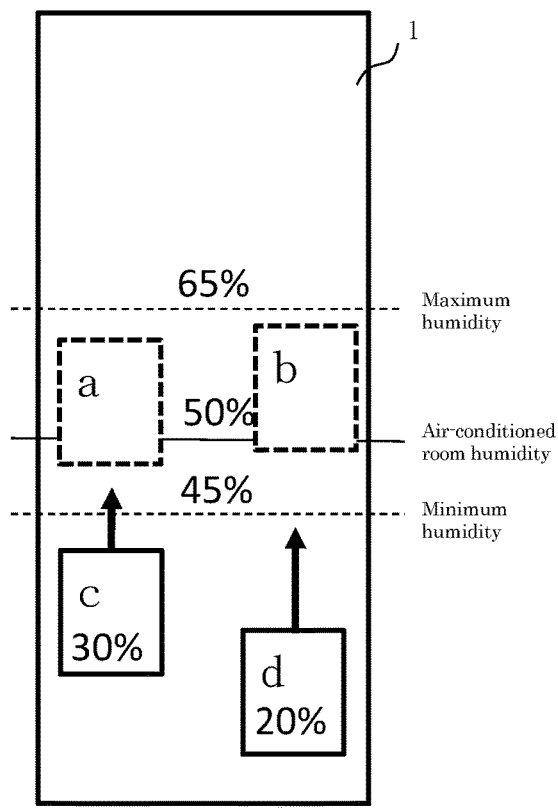
[Fig. 7B]
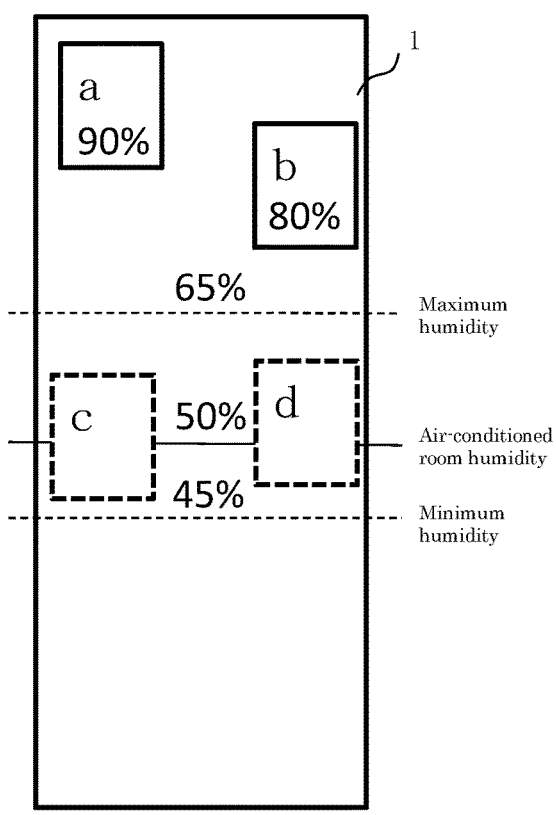

[Fig. 8A]
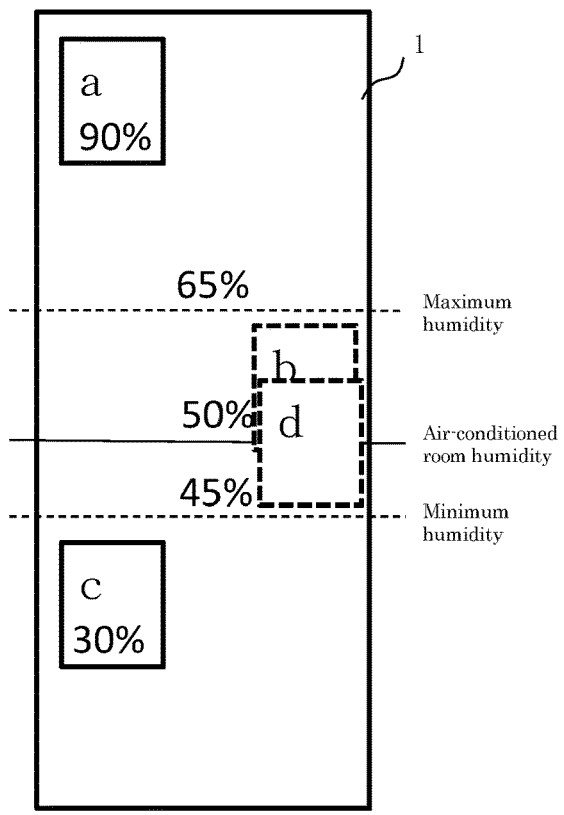
[Fig. 8B]
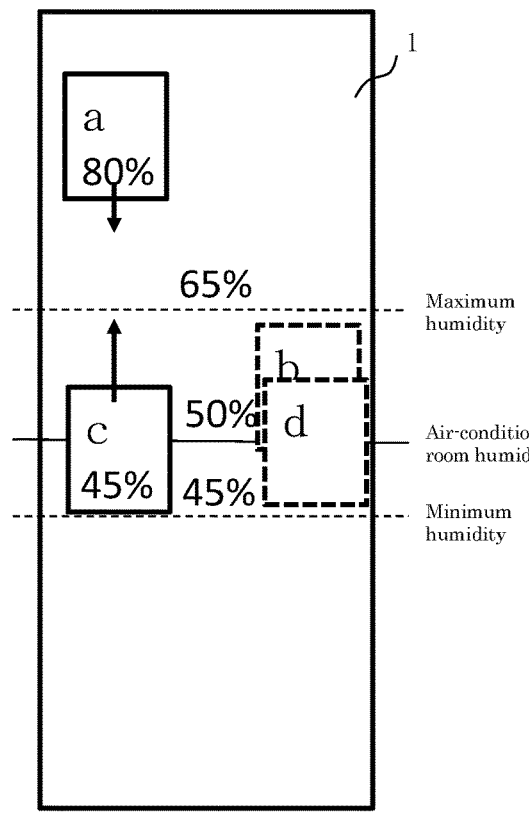
[Fig. 8C]
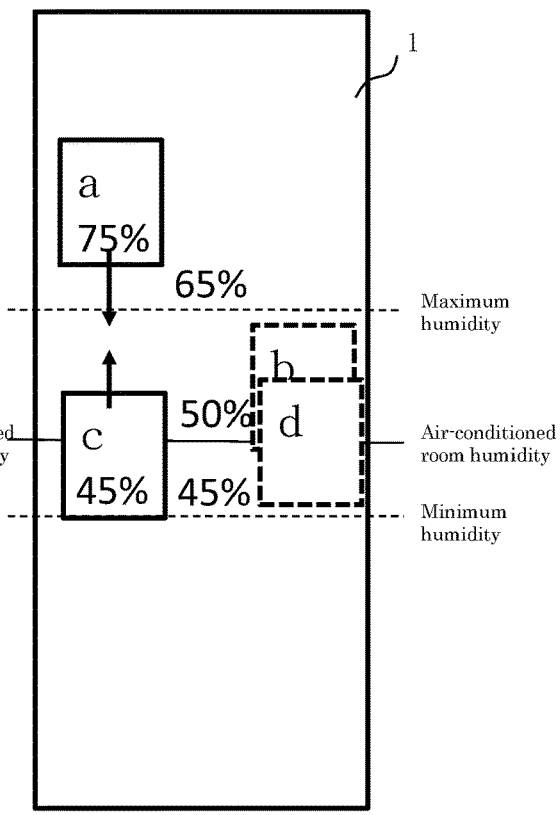

[Fig. 9]
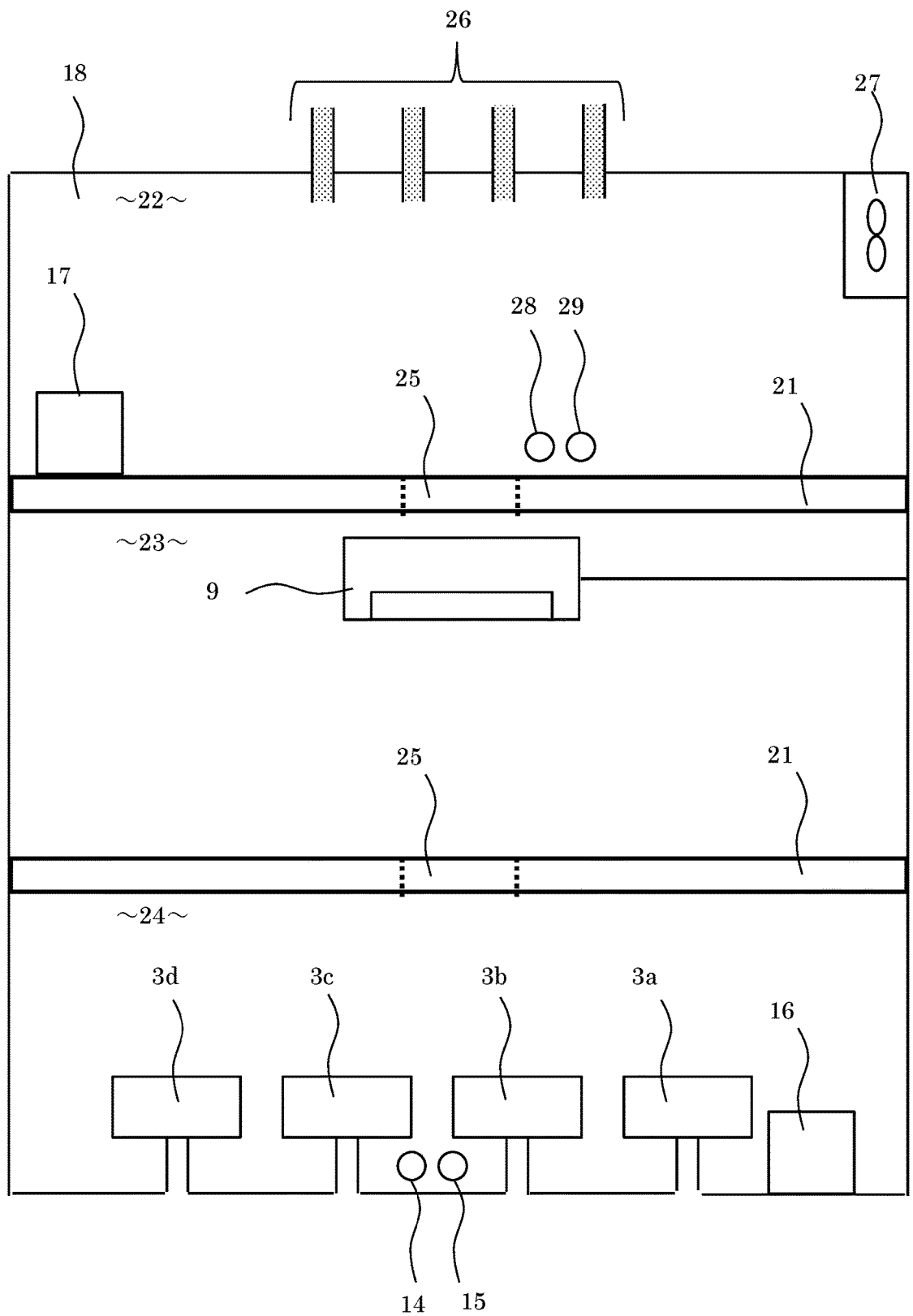

[Fig. 10]
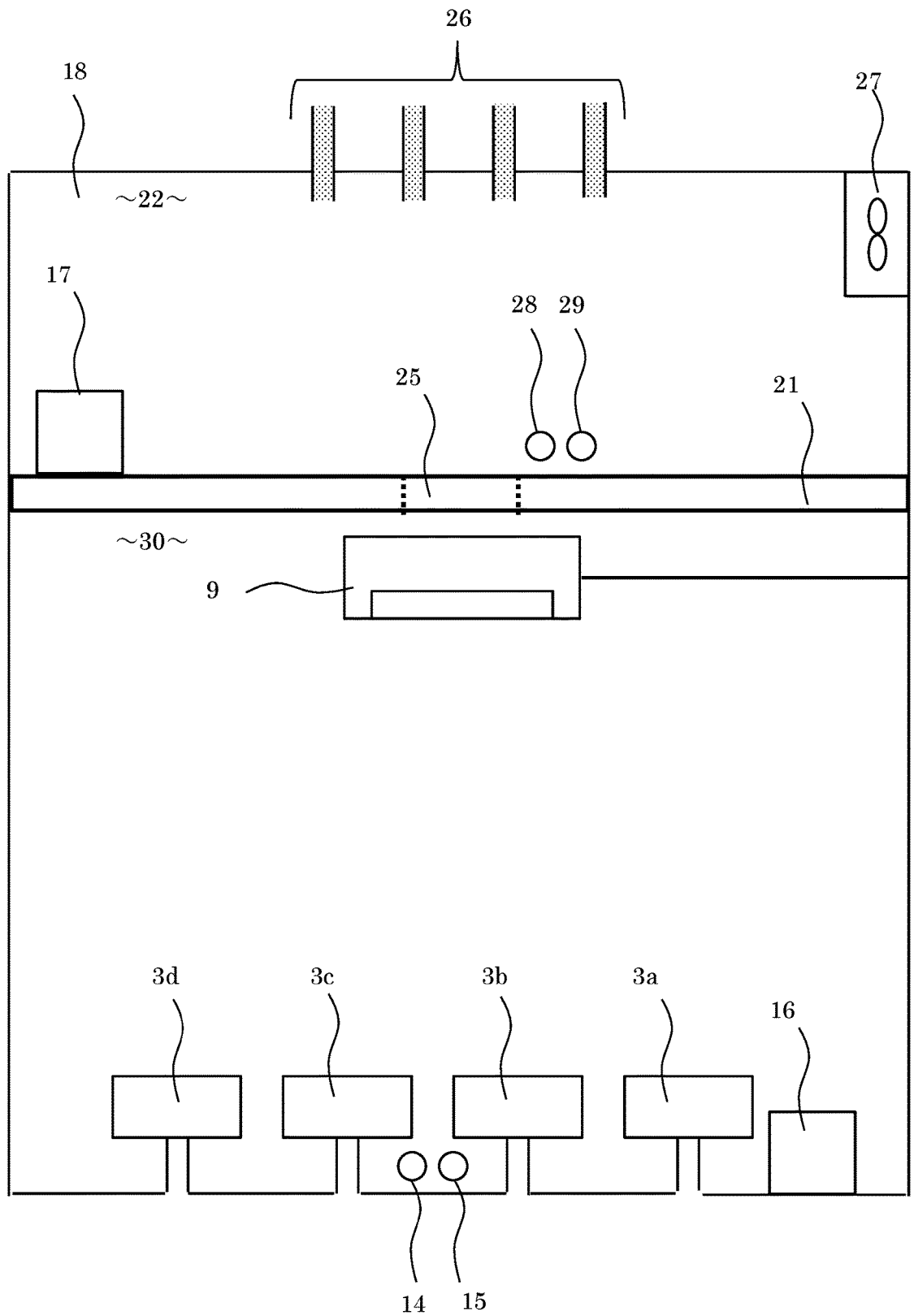

[Fig. 11]
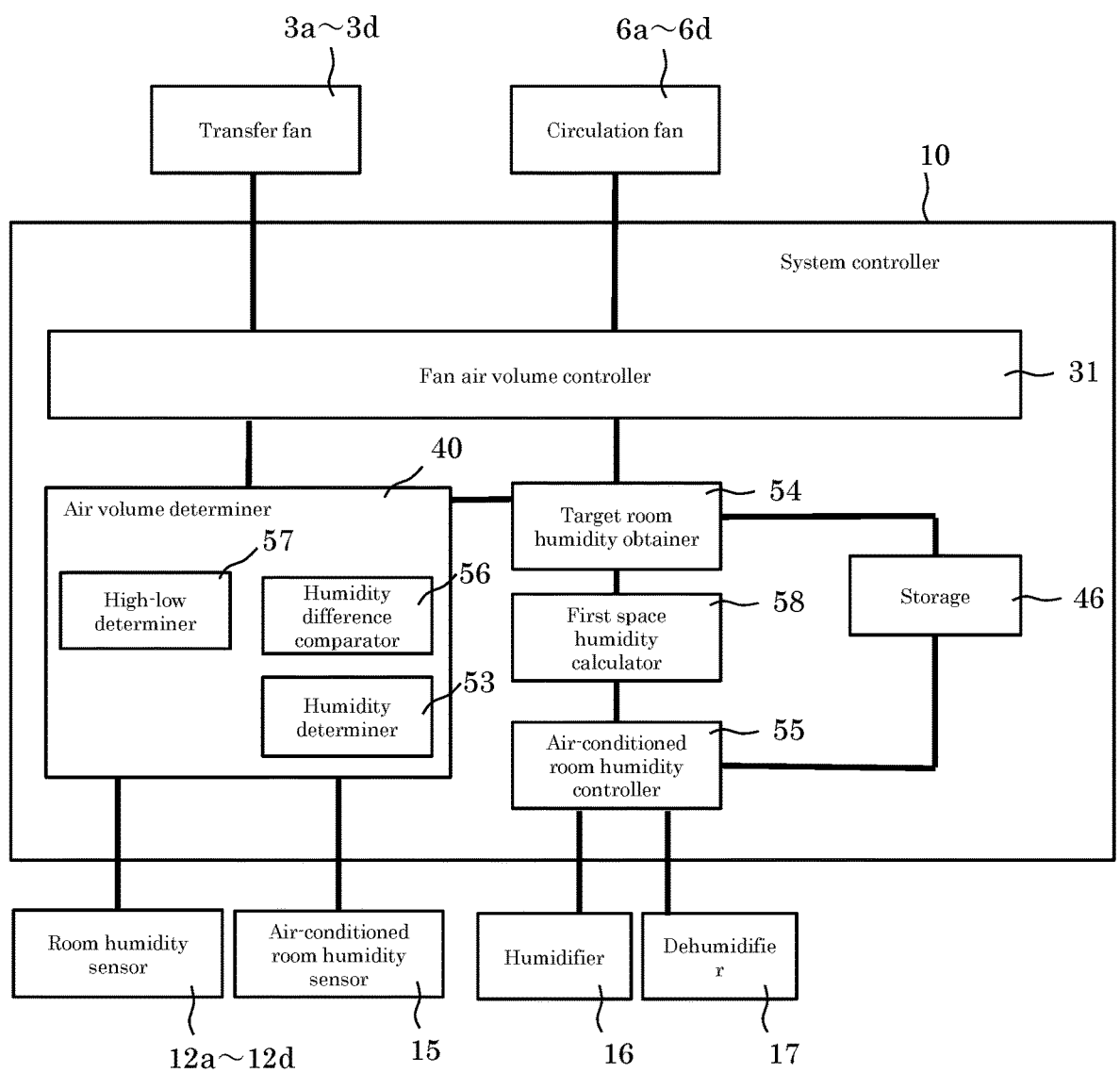

[Fig. 12]
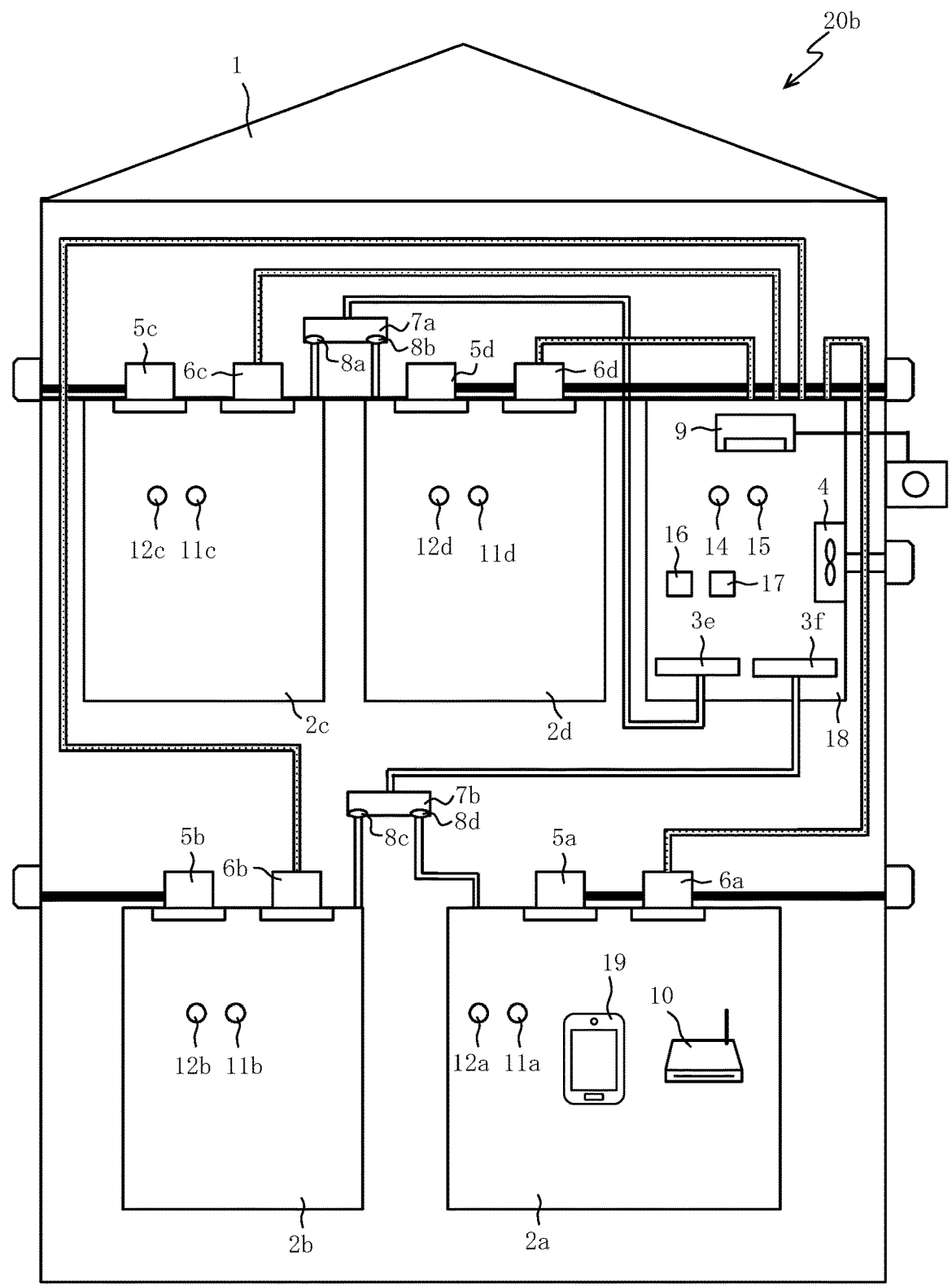

[Fig. 13]
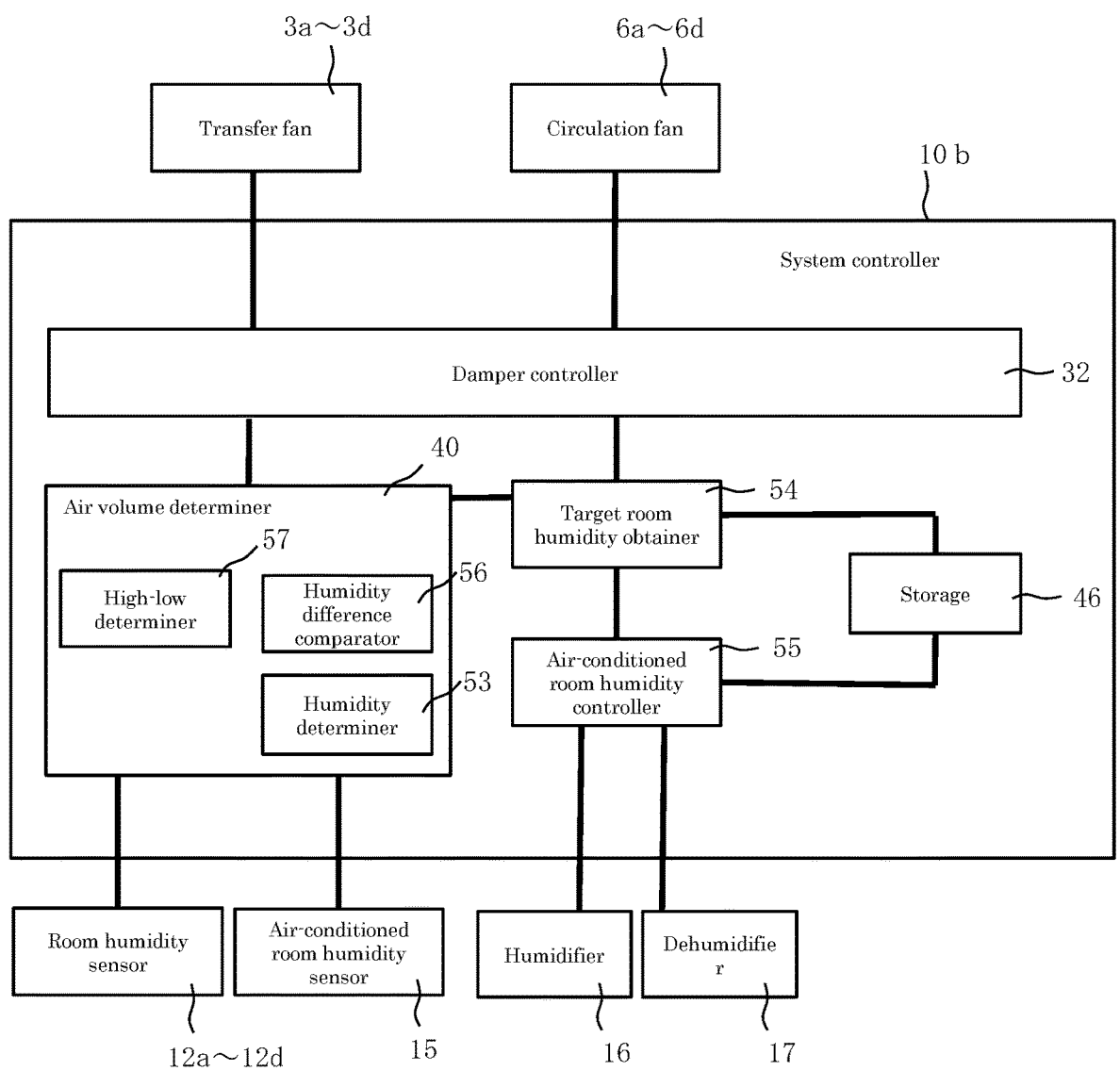

AIR-CONDITIONING SYSTEM AND AIR-CONDITIONING SYSTEM CONTROLLER

TECHNICAL FIELD

The present invention relates to an air-conditioning system and an air-conditioning system controller.

BACKGROUND ART

Residences are conventionally air conditioned with whole-house air-conditioners. Along with an increasing demand in energy-saving houses and tightening regulations, highly heat insulated and highly airtight houses are expected to increase and air-conditioning systems suitable for such features are desired accordingly.

For example, PTL 1 discloses a controller built in air conditioning equipment. The controller detects ambient temperature and humidity, when the air conditioning equipment is started, to determine target temperature and humidity according to environment. The controller also minimizes energy consumption while maintaining environmentally comfortable temperature and humidity.

CITATION LISTS

Patent Literatures

PTL1: Unexamined Japanese Patent Application Publication No. 2004-12006.

SUMMARY OF THE INVENTION

Unfortunately, to control temperature and especially humidity, the controller built in conventional air conditioning equipment has been hardly applicable to an air-conditioning system including an air-conditioned room and a plurality of transfer fans therein to supply air to a plurality of rooms. The controller of conventional air conditioning equipment detects the ambient humidity, determines the target humidity and maintains it to achieve comfortable environment. Humidity of each of the rooms is controlled by the controller built in the conventional air conditioning equipment, as such, humidity has negligible effect from outdoor environment.

In contrast, the air-conditioning system above described includes the air-conditioned room communicated with the rooms. Air of various humidity levels flows into the air-conditioned room leading to a significant change in humidity of the air-conditioned room. To control such a humidity of the air-conditioned room within a specified range, the air-conditioned room having a very large space enough for the rooms or improved dehumidification and humidification capacity have been necessary. However, these approaches are inefficient in terms of space or energy and a new approach to control humidity has been desired.

The present invention solves these conventional issues and intends to provide an air-conditioning system and an air-conditioning system controller contributing to a downsized air-conditioned room through efficient dehumidification and humidification.

To achieve this object, the air-conditioning system of the present invention includes a humidifier for humidifying air of the air-conditioned room and a dehumidifier for dehumidifying air of the air-conditioned room, a plurality of transfer fans for transferring air of the air-conditioned room to a corresponding one of a plurality of rooms independent from the air-conditioned room, a plurality of dampers each disposed for the corresponding one of the rooms for independently controlling an air volume to be transferred to the corresponding one of the rooms, a system controller for controlling the humidifier, the dehumidifier and the dampers, a plurality of room humidity sensors each obtaining a humidity of the corresponding one of the rooms to transmit it to the system controller and an air-conditioned room humidity sensor for obtaining a humidity of the air conditioned room to transmit it to the system controller. The system controller further includes an air-conditioned room humidity controller for controlling at least one of the humidifier and the dehumidifier to maintain the humidity of the air-conditioned room within a specified humidity range defined by a minimum humidity and a maximum humidity, an air volume determiner for determining the air volume passing through each of the dampers according to the humidity of the corresponding one of the rooms obtained by a corresponding one of the room humidity sensors and the humidity of the air-conditioned room obtained by the air-conditioned room humidity sensor and a damper controller for controlling the air volume to be transferred to each of the rooms passing through a corresponding one of the dampers at the air volume determined by the air volume controller.

The present invention also relates to the air-conditioning system controller for controlling the humidifier to humidify air of the air-conditioned room, the dehumidifier to dehumidify air of the air-conditioned room and the dampers for independently controlling the air volume of air to be transferred to the corresponding one of the rooms from the air-conditioned room. To achieve the object, the air-conditioning system controller includes the air-conditioned room humidity controller for controlling at least one of the humidifier and the dehumidifier to maintain the humidity of the air-conditioned room within the specified humidity range defined by the minimum humidity and the maximum humidity, the air volume determiner for determining the air volume passing through each of the dampers according to the humidity of the corresponding one of the rooms and the humidity of the air-conditioned room and the damper controller for controlling the air volume to be transferred to each of the rooms.

The present invention provides the air-conditioning system contributing to the downsized air-conditioned room through the efficient dehumidification and humidification.

BRIEF DESCRIPTION OF DRAWINGS

FIG. 1 is a connection schematic view of an air-conditioning system according to a first embodiment of the present invention.

FIG. 2 is a schematic function block diagram of a system controller of the air-conditioning system.

FIG. 3 is a flowchart of an air conditioning process.

FIG. 4 is a flowchart of an air-conditioned room humidity controlling process.

FIG. 5 is a flowchart of a fan air volume setting process.

FIG. 6 is a flowchart of an air volume determining process.

FIG. 7A is an example of a relationship between a target air conditioned room humidity, a humidity of air-conditioned room and a room humidity.

FIG. 7B is another example of the relationship between the target air-conditioned room humidity, the humidity of air-conditioned room and the room humidity.

FIG. 8A is still another example of the relationship between the target air-conditioned room humidity, the humidity of air-conditioned room and the room humidity.

FIG. 8B is still another example of the relationship between the target air-conditioned room humidity, the humidity of air-conditioned room and the room humidity.

FIG. 8C is still another example of the relationship between the target air-conditioned room humidity, the humidity of air-conditioned room and the room humidity.

FIG. 9 is a schematic view of the air-conditioned room divided into three spaces.

FIG. 10 is a schematic view of the air-conditioned room divided into two spaces.

FIG. 11 is a schematic function block diagram of the system controller of the air-conditioned room divided into three spaces.

FIG. 12 is a connection schematic view of an air-conditioning system according to a second embodiment of the present invention.

FIG. 13 is a schematic function block diagram of a system controller according to the second embodiment of the present invention.

DESCRIPTION OF EMBODIMENTS

Embodiments of the present invention will now be described with reference to the accompanying drawings. The embodiments below show preferred concrete examples of the present invention. As such, values, configuration, material, component, its arrangement position and connection configuration as well as steps (processes) and their order indicated in the embodiments are only examples and should not be intended to limit a scope of the present invention. Some of the components in the embodiments are described as voluntary components unless independent claims, which are the most significant concepts of the present invention, include them. The figures use identical symbols for components which are substantially the same each other and the repeated explanation is omitted or simplified.

First Embodiment

Air-conditioning system 20 according to a first embodiment of the present invention will now be described with reference to FIG. 1. FIG. 1 is a connection schematic view of air-conditioning system 20 according to the first embodiment of the present invention.

Air-conditioning system 20 includes outdoor air introducing fan 4, exhaust fans 5 (5a, 5b, 5c and 5d), transfer fans 3 (3a, 3b, 3c and 3d), circulation fans 6 (6a, 6b, 6c and 6d), room temperature sensors 11 (11a, 11b, 11c and 11d), room humidity sensors 12 (12a, 12b, 12c and 12d), air-conditioned room temperature sensor 14, air-conditioned room humidity sensor 15, air conditioner 9, humidifier 16, dehumidifier 17, input-output terminal 19 and system controller 10 (an air-conditioning system controller).

Air-conditioning system 20 is disposed in general residential house 1 of an example building. General residential house 1 includes a plurality of rooms 2 (2a, 2b, 2c and 2d) and at least one air-conditioned room 18 independent from them (four rooms for the embodiment). General residential house 1 (residential house) is for residents to live their private lives and usually has spaces including a living room, a dining room, bedrooms, a private room and a nursery. Spaces served by air-conditioning system 20 may be a toilet, a bathroom, a restroom, a dressing room and any other rooms.

Air transferred from each of rooms 2 mix with each other in air-conditioned room 18. Outdoor air introducing fan 4 introduces outdoor air into air-conditioned room 18. The introduced outdoor air mixes with air transferred from each of rooms 2 by a corresponding one of circulation fans 6. Temperature and humidity of air-conditioned room 18 are controlled by air conditioner 9, humidifier 16 and dehumidifier 17 disposed in air-conditioned room 18 to be transferred to each of rooms 2 by a corresponding one of transfer fans 3. Air-conditioned room 18 is a certain volume of space to accommodate air conditioner 9, humidifier 16 and dehumidifier 17 for air-conditioning each of the rooms but is not normally a space for residents to stay.

Air of each of rooms 2 is not only transferred to air-conditioned room 18 by the corresponding one of circulation fans 6 but also exhausted outside general residential house 1 by a corresponding one of exhaust fans 5 from each of rooms 2. Air-conditioning system 20 provides mechanical heat recovery ventilation by simultaneously controlling an exhaust air volume of each of exhaust fans 5 to exhaust indoor air and controlling an air supply volume of outdoor air introducing fan 4 to introduce outdoor air.

Outdoor air introducing fan 4 takes outdoor air into general residential house 1 and corresponds to an air supply function of an air supply fan or a heat-exchange ventilation fan. As described above, outdoor air taken by outdoor air introducing fan 4 is introduced into air-conditioned room 18. Outdoor air introducing fan 4 supplies air of variable air volume according to the exhaust air volume of each of exhaust fans 5 as described later.

Each of exhaust fans 5 partially exhausts air of the corresponding one of rooms 2 outside through a corresponding one of exhaust ducts and corresponds to an exhaust function of a ceiling-embedded ventilation fan, a wall-mounted ventilation fan, a range hood or a heat-exchange ventilation fan. In FIG. 1, each of the exhaust ducts connected to the corresponding one of exhaust fans 5 is directly communicated with outside general residential house 1. To exhaust air through the heat-exchange ventilation fan, each of the exhaust ducts extended from the corresponding one of the rooms is connected to the heat-exchange ventilation fan before connected outside general residential house 1. Air through each of the exhaust ducts is heat exchanged with air through a transfer duct of the heat-exchange ventilation fan and then exhausted outside general residential house 1. Each of exhaust fans 5a through 5d is disposed in the corresponding one of rooms 2a through 2d.

Each of exhaust fans 5 exhausts air of variable air volume. Each of exhaust fans 5 is normally controlled to exhaust air at a predetermined exhaust air volume. Otherwise, users may optionally set the exhaust air volume to each of exhaust fans 5a through 5d, or each of the exhaust air volumes is controlled according to values obtained by the sensors.

Each of transfer fans 3a through 3d is disposed on a wall of air-conditioned room 18 so as to communicate with the corresponding one of rooms 2a through 2d. Air of air-conditioned room 18 is transferred to each of rooms 2a through 2d through a corresponding one of transfer ducts. Each of the transfer ducts connected to the corresponding one of rooms 2a through 2d is independently provided.

Each of circulation fans 6a through 6d is disposed in the corresponding one of room 2a through 2d. Each of circulation fans 6a through 6d transfers part of air of the corresponding one of rooms 2a through 2d to air-conditioned room 18 through a corresponding one of circulation ducts. Each of the circulation ducts between air-conditioned room 18 and the corresponding one of the rooms may be independently provided or may be integrated together before connected to air-conditioned room 18.

Air conditioner 9 controls air of air-conditioned room 18 to achieve a target air-conditioned room temperature by cooling or heating air of air-conditioned room 18.

Humidifier 16 humidifies air of air-conditioned room 18 to achieve a target air-conditioned room humidity when humidity of air-conditioned room 18 is lower than the target air-conditioned room humidity. Humidifier 16 may be built in air conditioner 9, however, preferably may be installed independent from air conditioner 9 to humidify rooms 2 enough. The target air-conditioned room humidity is within a specified humidity range defined by a minimum humidity and a maximum humidity. Humidity described in the embodiments, including the minimum humidity and the maximum humidity, is expressed as a relative humidity, however, an absolute humidity may be also available. In either case, a unit of measurement is preferably unified in entire air-conditioning system 20.

Dehumidifier 17 dehumidifies air of air-conditioned room 18 to achieve the target air-conditioned room humidity when humidity of air-conditioned room 18 is higher than the target air-conditioned room humidity. Dehumidifier 17 may be built in air conditioner 9, however, dehumidifier 17 may be installed independent from air conditioner 9 to dehumidify rooms 2 enough.

Each of room temperature sensors 11a through 11d is disposed in the corresponding one of room 2a through 2d. Each of room temperature sensors 11a through 11d obtains a temperature of the corresponding one of rooms 2a through 2d to transmit it to system controller 10.

Each of room humidity sensor 12a through 12d is disposed in the corresponding one of room 2a through 2d. Each of room humidity sensors 12a through 12d obtains a humidity of the corresponding one of rooms 2a through 2d to transmit it to system controller 10.

Air-conditioned room temperature sensor 14 obtains temperature of air-conditioned room 18 to transmit it to system controller 10. If air-conditioned room temperature sensor 14 is built in air conditioner 9, it obtains only information around air conditioner 9 (for example, information around an air supply inlet). Air-conditioned room temperature sensor 14 is preferably installed in air-conditioned room 18 independent from air conditioner 9 so as to obtain whole information on air-conditioned room 18. This is because outdoor air mixes with air transferred from each of rooms 2.

Air-conditioned room humidity sensor 15 obtains humidity of air-conditioned room 18 to transmit it to system controller 10. For the same reason as that for air-conditioned room temperature sensor 14, air-conditioned room humidity sensor 15 is preferably installed in air-conditioned room 18 independent from air conditioner 9 so as to obtain whole information on air-conditioned room 18.

System controller 10 controls entire air-conditioning system 20. System controller 10 communicably and wirelessly connects to outdoor introducing fan 4, exhaust fans 5, transfer fans 3, circulation fans 6, room temperature sensors 11, room humidity sensors 12, air-conditioned room temperature sensor 14, air-conditioned room humidity sensor 15, air conditioner 9, humidifier 16 and dehumidifier 17.

System controller 10 simultaneously controls outdoor air introducing fan 4 and exhaust fans 5. For example, system controller 10 sets the air supply volume of outdoor air introducing fan 4 to match the exhaust air volume of each of exhaust fans 5. This provides the mechanical heat recovery ventilation with general residential house 1.

System controller 10 controls air conditioner 9, humidifier 16 and dehumidifier 17 according to temperature and humidity of air-conditioned room 18 obtained by air-conditioned room temperature sensor 14 and air-conditioned room humidity sensor 15 to achieve the target air-conditioned room temperature and/or the target air-conditioned room humidity.

System controller 10 sets the air volume of each of transfer fans 3 and the air volume of each of circulation fans 6 according to the temperature and/or the humidity of the corresponding one of rooms 2 obtained by the corresponding one of room temperature sensors 11 and the corresponding one of room humidity sensors 12 as well as the target temperature and/or the target humidity of rooms 2a through 2d.

Thus, air conditioned in air-conditioned room 18 is transferred to each of rooms 2 at the air volume set to the corresponding one of transfer fans 3. Air of each of rooms 2 is transferred to air-conditioned room 18 at the air volume set to the corresponding one of circulation fans 6. Then the temperature and/or the humidity of each of rooms 2 are controlled to achieve the target temperature and/or the target humidity.

System controller 10 may connect to outdoor air introducing fan 4, exhaust fans 5, transfer fans 3, circulation fans 6, room temperature sensors 11, room humidity sensors 12, air-conditioned room temperature sensor 14, air-conditioned room humidity sensor 15, air conditioner 9, humidifier 16 and dehumidifier 17 by wireless communication without complicated wiring. Or system controller 10 may communicably connect to all of these or with a part of them by wired communication.

Input-output terminal 19 communicably connects to system controller 10 by wireless communication. Input-output terminal 19 receives information to build air-conditioning system 20, store the information on system controller 10 or displays a status of air-conditioning system 20 obtained from system controller 10. An example of input-output terminal 19 is a portable information terminal such as a mobile phone, a smart phone, or a tablet.

Input-output terminal 19 may not necessarily connect to system controller 10 by the wireless communication but may connect to system controller 10 by wired communication. Input-output terminal 19 may be replaced by a remote controller mounted on a wall.

Functions of system controller 10 will now be described with reference to FIG. 2. FIG. 2 is a schematic function block diagram of system controller 10.

System controller 10 includes room target humidity obtainer 54, air-conditioned room humidity controller 55, air volume determiner 40, fan air volume controller 31 and storage 46. System controller 10 further includes a computer system having a processor and a memory. The processor executes a program stored in the memory to activate the computer system as system controller 10. The program executed by the processor may be previously installed in the computer system, may be stored in a recording medium such as a memory card or may be provided through a telecommunication line such as the Internet.

Room target humidity obtainer 54 obtains the target room humidity common to each of rooms 2a through 2d, which is input by input-output terminal 19. The target room humidity is within the specified humidity range defined by the minimum humidity and the maximum humidity. In the embodiment, the target room humidity is equal to the target air-conditioned room humidity. The embodiment allows users to input the target room humidity, however, the target room humidity may be previously set to air-conditioning system 20 as a fixed value. The minimum humidity and the maximum humidity obtained by room target humidity obtainer 54 or previously set are stored in storage 46.

Air-conditioned room humidity controller 55 controls humidifier 16 and dehumidifier 17 to achieve the target air-conditioned room humidity obtained by room target humidity obtainer 54. Specifically, when the humidity of the air-conditioned room obtained by air-conditioned room humidity sensor 15 is higher than the maximum humidity, air-conditioned room humidity controller 55 activates dehumidifier 17. When the humidity of the air-conditioned room obtained by air-conditioned room humidity sensor 15 is lower than the minimum humidity, air-conditioned room humidity controller 55 activates humidifier 16.

Air volume determiner 40 includes humidity determiner 53, humidity difference comparator 56 and high-low determiner 57. Air-volume determiner 40 determines the air volume of each of transfer fans 3 according to the humidity of the corresponding one of the rooms obtained by the corresponding one of room humidity sensors 12 and the humidity of air-conditioned room 18 obtained by air-conditioned room humidity sensor 15. A behavior of air volume determiner 40 is described later.

Humidity determiner 53 determines whether the humidity of each of rooms 2 is within the specified humidity range according to the humidity of the corresponding one of rooms 2 obtained by the corresponding one of room humidity sensors 12 and the target humidity of rooms 2 obtained by room target humidity obtainer 54.

Humidity difference comparator 56 calculates a difference between the humidity of each of rooms 2 obtained by the corresponding one of room humidity sensors 12 and the humidity of air-conditioned room 18 obtained by air-conditioned room humidity sensor 15. Specifically, for example, when the humidity of room 2a is 90% and the humidity of air-conditioned room 18 is 50%, the difference is 40%. The difference to be calculated may not necessarily be expressed in %, for example, it may be calculated from an amount of moisture based on the humidity and is enough to quantify how much the difference is between them.

High-low determiner 57 determines whether the humidity of each of the rooms obtained by the corresponding one of the room humidity sensors 12 is lower or higher than the humidity of air-conditioned room 18 obtained by air-conditioned room humidity sensor 15. Specifically, for example, when the humidity of room 2a is 90% and the humidity of the air-conditioned room is 50%, high-low determiner 57 determines that the humidity of room 2a (90%) is "higher" than that of the air-conditioned room (50%). When the humidity of room 2c is 30% and the humidity of the air-conditioned room is 50%, high-low determiner 57 determines that the humidity of room 2c (30%) is "lower" than that of the air-conditioned room (50%). This decision may be made about all the rooms, or a room determined to have a humidity higher than the maximum humidity and/or a room determined to have a humidity lower than the minimum humidity.

Fan air volume controller 31 controls the air volume of each of transfer fans 3a through 3d disposed for the corresponding one of rooms 2a through 2d to achieve the air volume determined by air volume determiner 40. Fan air volume controller 31 may also control the air volume of each of circulation fans 6a through 6d, however, detailed descriptions are omitted here.

Storage 46 is, so called, a memory which stores the specified humidity range (the minimum humidity and the maximum humidity) obtained by room target humidity obtainer 54 or previously set. Storage 46 also stores information such as numerical values for system controller 10.

An air conditioning process executed by system controller 10 will now be described with reference from FIG. 3 through FIG. 8C. FIG. 3 is a flow chart of the air conditioning process. FIG. 4 is a flowchart of an air-conditioned room humidity controlling process. FIG. 5 is a flowchart of a fan air volume setting process. FIG. 6 is a flowchart of an air volume determining process. FIG. 7A and FIG. 7B are examples of relationships between the target air-conditioned room humidity, the humidity of the air-conditioned room and the room humidity. FIG. 8A, FIG. 8B and FIG. 8C are different examples of the relationships between the target air-conditioned room humidity, the humidity of the air-conditioned room and the room humidity.

As indicated in FIG. 3, system controller 10 executes the air-conditioning process mainly including air-conditioned room humidity control process S100 and fan air volume setting process S200.

System controller 10 first executes air-conditioned room humidity control process S100 in FIG. 4 according to a user setting.

In air-conditioned room humidity control process S100, system controller 10 obtains the target room humidity input by input-output terminal 19 to store it in storage 46 (S101). The target room humidity is comfortable to the user and common to all the rooms. The target room humidity is within the specified humidity range defined by the minimum humidity and the maximum humidity. The specified humidity range is equal to a target humidity range of air-conditioned room 18 and includes the target air-conditioned room humidity. For example, when the user inputs the minimum humidity of 45% and the maximum humidity of 65% to input/output terminal 19, system controller 10 obtains a target humidity range of rooms 2 input to input-output terminal 19 as the target humidity range of air-conditioned room 18 through room target humidity obtainer 54.

System controller 10 obtains the target air-conditioned room humidity, then air-conditioned room humidity controller 55 maintains the humidity of air-conditioned room 18 within the target air-conditioned room humidity range by using air-conditioned room humidity sensor 15, humidifier 16 and dehumidifier 17 (S102).

Specifically, to maintain the target air-conditioned room humidity, when the humidity of the air-conditioned room obtained by air-conditioned room humidity sensor 15 is higher than the maximum humidity, air-conditioned room humidity controller 55 activates dehumidifier 17. When the humidity of the air-conditioned room obtained by air-conditioned room humidity sensor 15 is lower than the minimum humidity, air-conditioned room humidity controller 55 activates humidifier 16. The humidity controlled in the air-conditioned room may fluctuate due to air flowing into air-conditioned room 18. As such, given that the humidity of the air-conditioned room is within the specified humidity range, the air-conditioned room may be dehumidified to achieve a humidity lower than the maximum humidity within a certain range (for example, minus 5%). In contrast, the air-conditioned room may be humidified to achieve a humidity higher than the minimum humidity within the certain range (for example, plus 5%).

Thus, the humidity of air-conditioned room 18 is maintained within the specified humidity range.

System controller 10 then executes fan air volume setting process (S200) in FIG. 5.

In fan air volume setting process (S200), air volume determiner 40 obtains the humidity of air-conditioned room 18 through air-conditioned room humidity sensor 15 (S201). Air volume determiner 40 obtains the humidity of each of rooms 2 through the corresponding one of room humidity sensors 12 (S202). Additionally, system controller 10 obtains the specified humidity range (the minimum humidity and the maximum humidity) from storage 46 through room target humidity obtainer 54 (S203).

Air volume determiner 40 then determines whether the humidity of each of the rooms is within the specified humidity range through humidity determiner 53 (S203).

Consequently, the air conditioning process terminates if the humidity of each of the rooms is within the specified humidity range (S204: Yes→termination).

If at least one room is not within the specified humidity range, humidity difference comparator 56 calculates the difference in humidity between such room and the air-conditioned room (S204: No→S205). Additionally, high-low determiner 57 determines whether the humidity of such room is higher or lower than that of the air-conditioned room (S206). The humidity of such room may be compared with the humidity of the air conditioned room obtained by air-conditioned room humidity sensor 15, or the humidity of such room may be determined whether to be within the specified humidity range or not. High-low determiner 57 segments rooms 2 (2a through 2d) determined to be not within the specified humidity range into a group of high-humidity room higher than the maximum humidity and a group of low-humidity room lower than the minimum humidity. High-low determiner 57 associates such room with the temperature difference calculated by humidity difference comparator 56. Air volume determiner 40 obtains the number of each of the high-humidity room and low-humidity room and the humidity difference between such room and the air-conditioned room.

After fan air volume setting process (S200), air volume determiner 40 then executes an air volume determining process (S300).

Air volume determiner 40 executes the air volume determining process (S300) in FIG. 6. Air volume determiner 40 first counts the number of each of the low-humidity room and the high-humidity room.

When only the low-humidity rooms are present, air volume determiner 40 determines to transfer an air volume of the room determined to have a large humidity difference more than that of the room determined to have a small humidity difference (S301: Yes 4 S303). This process is detailed with reference to FIG. 7A. FIG. 7A is an example where only the low-humidity rooms are present. In FIG. 2, "a" shows room 2a, equally "b" shows room 2b, "c" shows room 2c and "d" shows room 2d, and the numerical values below show the humidity of each of the low-humidity rooms. In FIG. 7A, the maximum humidity is 65%, the minimum humidity is 45% and the humidity of the air-conditioned room is 50%.

FIG. 7A includes only two low-humidity rooms (room 2c, room 2d). Room 2c has a humidity of 30% and room 2d has a humidity of 20% (absolute value). The humidity of room 2c is smaller than that of the air-conditioned room by 20% and the humidity of room 2d is smaller than that of the air-conditioned room by 30%. Air volume determiner 40 determines more air volume of transfer fan 3d in room 2d than that of transfer fan 3c in room 2c. The air volume is reworded to be an air flow capacity or an air volume switch of each of the transfer fans. For example, when the air volume of each of transfer fans 3 is configurable in ascending order between "air volume 1" and "air volume 10", air volume determiner 40 determines the air volume of transfer fan 3d to be "air volume 10" of maximum and the air volume of transfer fan 3c to be "air volume 7" smaller than that of transfer fan 3d.

Thus, air of the air-conditioned room is transferred to room 2c and room 2d, the humidity of each of the rooms gradually gets close within the specified humidity range. The humidity of room 2d, which is considered as being more uncomfortable, is improved faster than that of room 2c because air volume determiner 40 prioritizes improving the humidity of the room determined to have a larger humidity difference.

The humidity of the air-conditioned room gradually reduces from 50% due to dry air flowing from room 2c and room 2d. When the humidity of the air-conditioned room is likely to be below the minimum humidity, air-conditioned room humidity controller 55 activates humidifier 16 accordingly to maintain the humidity of the air-conditioned room within the specified humidity range.

Air volume determiner 40 counts the number of each of the low-humidity room and the high-humidity room. As with the low-humidity room, when only the high-humidity rooms are present, air volume determiner 40 determines more air volume of the room determined to have a large humidity difference than that of the room determined to have a small humidity difference (S301: No→S302: Yes→S303).

This process is detailed with reference to FIG. 7B. FIG. 7B is an example where only high-humidity rooms are present.

FIG. 7B includes only two high-humidity rooms (room 2a, room 2b). Room 2a has a humidity of 90% and room 2b has a humidity of 80% (absolute value). The humidity of room 2a is larger than that of the air-conditioned room by 40% and the humidity of room 2b is larger than that of the air-conditioned room by 30%. Air volume determiner 40 determines more air volume of transfer fan 3a in room 2a than that of transfer fan 3b in room 2b because room 2a has the humidity difference larger than that of room 2b. Air volume determiner 40 determines the air volume of transfer fan 3a to be "air volume 10" of maximum. Air volume determiner 40 determines, for example, the air volume of transfer fan 3b to be "air volume 7" smaller than that of transfer 3a.

Air of the air-conditioned room is transferred to room 2a and room 2b, the humidity of each of the rooms gradually gets close within the specified humidity range. The humidity of room 2a, which is considered as being more uncomfortable, is improved faster than that of room 2b because air volume determiner 40 prioritizes improving the humidity of the room determined to have a larger humidity difference.

The humidity of the air-conditioned room gradually increases from 50% due to moist air flowing from room 2a and room 2b. When the humidity of the air-conditioned room is likely to be above the maximum humidity, air-conditioned room humidity controller 55 activates dehumidifier 17 accordingly to maintain the humidity of the air-conditioned room within the specified humidity range.

Air volume determiner 40 counts the number of each of the low-humidity room and the high-humidity room. When both the low-humidity room and the high-humidity room are present, air volume determiner 40 determines more air volume of the room determined to have a small humidity difference than that of the room determined to have a large humidity difference (S302: No→S304: Yes→S305).

This process is detailed with reference to FIG. 8 (FIG. 8A, FIG. 8B and FIG. 8C). FIG. 8A includes only the low-humidity rooms, for example. FIG. 8A, FIG. 8B and FIG. 8C may be understood equally with FIG. 7A and FIG. 7B.

FIG. 8A includes low-humidity room 2c and high-humidity room 2a. Room 2c has a humidity of 30% and room 2a has a humidity of 90% (absolute value). The humidity of room 2c is smaller than that of the air-conditioned room by 20% and the humidity of room 2a is larger than that of the air-conditioned room by 40%. Air volume determiner 40 determines less air volume of transfer fan 3a in room 2a than that of transfer fan 3c in room 2c because room 2a has the humidity difference larger than that of room 2c. In other words, air volume determiner 40 determines more air volume of transfer fan 3c in room 2c than that of transfer fan 3a in room 2a because room 2c has the humidity difference smaller than that of room 2a. Specifically, air volume determiner 40 determines the air volume of transfer fan 3c to be "air volume 10" of maximum. Air volume determiner 40 determines, for example, the air volume of transfer fan 3a to be "air volume 5" smaller than that of transfer fan 3c.

Thus, air of the air-conditioned room is transferred to room 2a and room 2c, the humidity of each of the rooms gradually gets close within the specified humidity range. As indicated in FIG. 8B, air volume determiner 40 prioritizes improving the humidity of room 2c determined to have a smaller humidity difference.

Different from S303, fluctuation in humidity of the air-conditioned room is minimized by differentiating between the air volumes flowing into the air-conditioned room from each of room 2a and room 2c. Specifically, air volume determiner 40 ideally equalizes moisture inflow into the air-conditioned room and moisture outflow from the air-conditioned room by transferring more air volume of the room determined to have a small humidity difference than that of the room determined to have a large humidity difference. This results in minimizing the fluctuation in humidity of the air-conditioned room and operation of humidifier 16 and dehumidifier 17 leading to efficient energy saving. Humidity of the air-conditioned room is efficiently controlled and this allows downsizing the air-conditioned room.

Air volume determiner 40 may determine to transfer an identical air volume between transfer fan 3c in room 2c determined to have a small humidity difference and transfer fan 3a in room 2a determined to have a large humidity difference. Specifically, air volume determiner 40 determines, for example, each of the air volumes of transfer fan 3c and transfer fan 3a to be "air volume 10". As indicated in FIG. 8C, the humidity of room 2c is improved faster than that of room 2a. Before the humidity of room 2c is improved, low humidity air from room 2c and high humidity air from room 2a mix with each other in the air-conditioned room, thus, the fluctuation in humidity of the air-conditioned room is minimized. The high humidity air of room 2a may slightly increase the humidity of the air-conditioned room, however, air-conditioned room humidity controller 55 may activate dehumidifier 17 accordingly. This also contributes to the efficient energy saving and downsizing the air-conditioned room.

Air volume determiner 40 counts the number of each of the low-humidity room and the high-humidity room. If none of them is present, at least either the low-humidity room or the high-humidity room is present. Air volume determiner 40 determines to transfer a specified air volume to such room, then the humidity of such room is within the specified humidity range (S304: No→S306).

After the air-conditioning process is initially executed, air-conditioned room humidity control process S100 and fan air volume setting process S200 are independently repeated.

The air-conditioning system and the system controller according to the present invention have been described. The embodiments are only examples and should not be limited thereto.

For example, each of circulation fans 6a through 6d and each of transfer fans 3a through 3d communicate with each other by the corresponding one of the transfer ducts, which connect each of the rooms and the air-conditioned room. However, each of circulation fans 6a through 6d is not necessarily connected to the air-conditioned room by the corresponding one of the circulation ducts, a space such as a hallway between the rooms may be also used as the circulation ducts. Air of each of the rooms is transferred to the hallway by the corresponding one of circulation fans 6a through 6d. Air of the hallway transferred from each of the rooms is introduced into air-conditioned room 18 communicated with the hallway. Air may be introduced into air-conditioned room 18 by separately installing a circulation fan on the hallway wall adjacent to air-conditioned room 18 or by depressurization of air-conditioned room 18 without using the circulation fan. Such a configuration may reduce efficiency in air circulation compared to that applied in the embodiment using the circulation ducts, this configuration still contributes to the efficient energy saving and downsizing air-conditioning system.

Then, air-conditioned room 18 according to the first embodiment of the present invention will now be described with reference to FIG. 9, FIG. 10 and FIG. 11. FIG. 9 and FIG. 10 are schematic views of air-conditioned room 18 according to the first embodiment. FIG. 9 is the schematic view of the air-conditioned room divided into three spaces and FIG. 10 is the schematic view of the air-conditioning room divided into two spaces. FIG. 11 is a schematic function block diagram of the system controller of the air-conditioned room divided into three spaces. FIG. 11 is as in FIG. 2 except that FIG. 11 further includes first space humidity calculator 58.

Air-conditioned room 18 is not divided in FIG. 1 and air conditioner 9, humidifier 16 and dehumidifier 17 controls temperature and humidity in the same space. In contrast, air-conditioned room 18, divided into two or three spaces in FIG. 9 and FIG. 10, is efficiently dehumidified and humidified.

Specifically, as indicated in FIG. 9, temperature and humidity of air conditioned room 18 are separately controlled in different spaces. For example, air-conditioned room 18 is divided into three independent spaces, first space 22, second space 23 and third space 24 by partition board 21 in FIG. 9. System controller 10 controls the components including air conditioner 9, humidifier 16 and dehumidifier 17. First space 22, second space 23 and third space 24 are vertically disposed in air-conditioned room 18. Each of transfer fans 3 transfers air of the air-conditioned room downstream.

Partition board 21, which is made of materials including a wooden or gypsum board, serves as a separation between first space 22 and second space 23 and the same between third space 23 and space 24. Additionally, partition board 21, when applied by insulation boards, prevents heat or moisture transition between the spaces. Partition board 21 has space-connecting opening 25, which is round or square shape. Thus, first space 22 and second space 23 as well as second space 23 and third space 24 are independent spaces communicated with each other through space-connecting opening 25.

When no partition board 21 is provided, an area of space-connecting opening 25 has, for example, is 30% or less in an entire contact surface area between first space 22 and second space 23, preferably 20% or less. This is because, if the area is too large, air-conditioned room 18 is less efficiently dehumidified and humidified, if the area is too small, increased pressure loss adversely affects ventilation efficiency between the spaces. In addition to space-connecting opening 25, a forced-air fan such as a pipe fan may be disposed in each of the openings to increase the ventilation efficiency between the independent spaces vertically disposed.

First space 22 includes first air supply openings 26 for supplying indoor air and second air supply opening 27 for supplying outdoor air disposed in its upstream, and space-connecting opening 25 communicated with second space 23 disposed in its downstream. Dehumidifier 17, first space temperature sensor 28 and first space humidity sensor 29 are disposed in first space 22. According to such a configuration, indoor air from first air supply openings 26 and outdoor air from second air supply opening 27 mix with each other in first space 22. The mixed air usually contains more fresh outdoor air than the indoor air. The indoor air included in the mixed air is close to the target temperature and the target humidity set by system controller 10. This is because the indoor air is originally transferred to each of rooms 2a through 2d from the air-conditioned room by the corresponding one of transfer fans 3a through 3d and then returns into first space 22. In contrast, outdoor air temperature and humidity during summer or rainy season are normally higher than the target temperature and the target humidity. Outdoor air is supplied more than the indoor air to first space 22, thus, first space 22 is subject to high temperature and humidity environment. When the mixed air of first space 22 has humidity higher than the target humidity of air-conditioned room 18, the mixed air is dehumidified by dehumidifier 17 in first space 22 to achieve the target humidity of the air-conditioned room. The dehumidified air of first space 22 is transferred into second space 23 through space-connecting opening 25. The detail is described later.

First space temperature sensor 28 obtains the temperature of first space 22 to transmit it system controller 10. As described above, as the outdoor air and the indoor air transferred from each of rooms 2 mix with each other in first space 22, first space temperature sensor 28 is preferably disposed downstream, that is, adjacent to space-connecting opening 25 to obtain information on entire first space 22.

First space humidity sensor 29 obtains the humidity of first space 22 to transmit it system controller 10. For the same reason as first space temperature sensor 28, first space humidity sensor 29 is also preferably disposed downstream, that is, adjacent to space-connecting opening 25 to obtain information on entire first space 22.

Second space 23 includes space-connecting opening 25 communicated with first space 22 disposed in its upstream and includes the same communicated with third space 24 disposed in its downstream. Second space 23 also includes air conditioner 9. According to such a configuration, air dehumidified in first space 22 is cooled or heated by air conditioner 9 in second space 23 to achieve the target temperature of the air-conditioned room. Then, the cooled or heated air is transferred to third space 24 through space-connecting opening 25 communicated with third space 24.

Third space 24 includes space-connecting opening 25 communicated with second space 23 disposed in its upstream, transfer fans 3a through 3d and humidifier 16 disposed in its downstream. Additionally, air-conditioned room temperature sensor 14 and air-conditioned room humidity sensor 15 are disposed in the downstream of third space 24, that is, adjacent to transfer fans 3a through 3d. According to such a configuration, the air cooled or heated in second space 23 is humidified by humidifier 16 in third space 24 to achieve the target humidity of the air-conditioned room when lower than the target humidity of the air-conditioned room. The humidified air is transferred to each of rooms 2a through 2d by the corresponding one of transfer fans 3a through 3d.

Thus, the target temperature and the target humidity of the air conditioned room are independently controlled in the different spaces, resulting in efficient dehumidification and humidification. Specific procedures of the dehumidification and humidification and their effects are described hereinafter.

For example, given that the air of air-conditioned room 18 is cooled or dehumidified in the high temperature and humidity environment during the summer or rainy season, air-conditioned room humidity controller 55 first calculates the difference between the target air-conditioned room humidity and the humidity of air-conditioned room 18 (the humidity of third space 24). Then, when the humidity of third space 24 is higher than the target air-conditioned room humidity, dehumidifier 17 disposed in first space 22 dehumidifies air-conditioned room 18. Air dehumidified in first space 22 is transferred to second space 23. In second space 23, when the temperature of second space 23 is higher than the target air-conditioned room temperature, air conditioner 9 disposed in second space 23 cools air-conditioned room 18. Humidity (relative humidity) of air dehumidified in first space 22 varies due to being cooled in second space 23. However, air-conditioned room humidity controller 55 controls air of first space 22 to achieve a specified humidity lower than a humidity (relative humidity) of air transferred outside air-conditioned room 18 through transfer fans 3. That is, first space humidity calculator 58 calculates the target humidity of first space 22 on the assumption that second space 23 is subsequently cooled by air conditioner 9.

Specifically, first space humidity calculator 58 calculates the target humidity (relative humidity) of first space 22 according to the target temperature and the target humidity (relative humidity) of air to be transferred to each of the rooms and the temperature of first space 22. The procedure will now be described below.

First space humidity calculator 58 calculates an amount of moisture contained in air to be transferred (absolute humidity) according to the target room temperature and the target room humidity (relative humidity). During the summer or rainy season, air is transferred to each of rooms 2a through 2d from third space 24 after being cooled in second space 23 as described above. The absolute humidity of first space 22 calculated by first space humidity calculator 58 is equal to a target absolute humidity of air transferred to each of rooms 2a through 2d. First space humidity calculator 58 then detects the temperature of first space 22. Thus, the target humidity (relative humidity) at the temperature of first space 22 is calculated. During the summer or rainy season, second space 23 is cooled by air conditioner 9 accordingly to be lower than first space 22. Thus, the humidity (relative humidity) of first space 22 is lower than that of second space 23. As such, the humidity of first space 22 (relative humidity) is controlled to be lower than the target room humidity (relative humidity).

As described above, during the summer or rainy season, high temperature and humidity air is transferred to first space 22. The higher the temperature is, the more saturated water vapor the air can hold. In such an environment, first space 22 is efficiently dehumidified by slightly reducing the temperature thereof with a heat exchanger equipped with dehumidifier 17 to remove a significant amount of water therefrom.

During the rainy season, when air conditioner 9 and dehumidifier 17 are disposed together in air-conditioned room 18, air conditioner 9 is in a thermo-off state because the difference in temperature between the outdoor air and air-conditioned room 18 is small. In such a state, air-conditioned room humidity controller 55 activates only dehumidifier 17, thus the temperature of air-conditioned room 18 is higher than that of the outdoor air due to heat dissipation from dehumidifier 17. As such, the high temperature air is transferred to each of rooms 2a through 2d. However, dehumidifying the air of first space 22 in advance allows the air heated by the heat dissipation from dehumidifier 17 to be transferred to air conditioner 9, thus, air conditioner 9 cools the air to achieve the target air-conditioned room temperature. Air-conditioned room 18 is expected to be relatively small, when air conditioner 9 and dehumidifier 17 are disposed together in air-conditioned room 18, the target air-conditioned room temperature is hardly achieved because cooling by air conditioner 9 and heating by the heat dissipation from dehumidifier 17 are simultaneously provided. However, air-conditioned room 18 divided into some spaces allows to separately dispose dehumidifier 17 and air conditioner 9. Thus, the target air-conditioned room temperature and humidity are readily achieved.

For example, given that the air of air-conditioned room 18 is heated or humidified in the low temperature and humidity environment during the winter. Air-conditioned room humidity controller 55 detects the humidity of first space 22 to determine whether to dehumidify first space 22 or not. However, very low humidity of winter air is not dehumidified. As such, the indoor air from first air supply opening 26 and the outdoor air from second air supply opening 27 only mix with each other in first space 22.

The air of second space 23 lower than the target air-conditioned room temperature is heated by air conditioner 9 to achieve the target air-conditioned room temperature. However, the humidity (relative humidity) of second space 23 significantly reduces due to heating. The air heated to the target air-conditioned room temperature in second space 23 is transferred to third space 24.

Air-conditioned room humidity controller 55 calculates the difference between the target air-conditioned room humidity and the humidity of third space 24. When the humidity of third space 24 is lower than the target air-conditioned room humidity, air-conditioned room humidity controller 55 activates humidifier 16 disposed in third space 24. Thus, air transferred from each of transfer fans 3a through 3d disposed in third space 24 achieves the target air-conditioned room humidity and the target air-conditioned room temperature.

According to the above configuration, the air heated by air conditioner 9 is transferred to third space 24. The higher the temperature is, the more saturated water vapor the air can hold, resulting in increased absolute humidity. Thus, third space 24 is efficiently humidified by absorbing the moisture from humidifier 16 to achieve the target air-conditioned room humidity. Then, each of transfer fans 3a through 3d transfers the air to the corresponding one of rooms 2a through 2d.

The above described configuration of air-conditioned room 18, which is divided into three spaces, of the air-conditioning system according to the present invention is only an exemplary embodiment, should not be limited thereto.

For example, as indicated in FIG. 10, second space 23 may be combined with third space 24 as second-third space 30 to cool, heat and humidity air in the same space.

In the high temperature and humidity environment during the summer or rainy season, same as the air-conditioned room divided into three spaces described above, the air is dehumidified in first space 22 and then cooled in second-third space 30. In the low temperature and humidity environment during the winter, the air is simultaneously heated and humidified in second-third space 30. In such a configuration, the air of the temperature lower than that of the air-conditioned room is transferred to second/third space 30 from first space 22. As such, humidifying efficiency in second-third space 30 is reduced compared to that of the air-conditioned room divided into three spaces. However, second/third space 30 accommodates more volume of humidifying space than that of third space 24. Second/third space 30 holds more amount of highly-humidified air than that of third space 24, resulting in more efficient humidifying to achieve the target air-conditioned room humidity. Additionally, the number of partition board 21 is reduced from two to one, resulting in a cost reduction in air-conditioned room 18.

Second Embodiment

Air-conditioning system 20b will now be described according to a second embodiment of the present invention with reference to FIGS. 12 and 13. The second embodiment primarily describes differences from a first embodiment. FIG. 12 is a connection schematic view of the air-conditioning system according to the second embodiment. FIG. 13 is a schematic function block diagram of system controller 10b according to the second embodiment.

Air-conditioning system 20b includes transfer fans 3e and 3f instead of transfer fans 3a, 3b, 3c and 3d in the first embodiment and further includes a plurality of chambers 7 (chamber 7a and chamber 7b).

System controller 10b includes damper controller 32 instead of fan air volume controller 31 in the first embodiment.

Each of transfer fans 3e and 3f is disposed, for example, on a wall of air-conditioned room 18 and each communicated with different chambers 7. Transfer fans 3e and 3f communicably connect to system controller 10b. Damper controller 32 independently controls each of transfer fans 3e and 3f including changing (adjusting) air volumes and their on-off. Air of air-conditioned room 18 is transferred to chamber 7a through a duct by transfer fan 3e and is also transferred to chamber 7b through another duct by transfer fan 3f.

Chambers 7 (chamber 7a and chamber 7b) are hollow boxed-shape each including air-sending openings each equipped with a corresponding one of dampers 8 (damper 8a, 8b, 8c and 8b). Chamber 7a includes two air-sending openings each equipped with damper 8a and damper 8b. Damper 8a connects to room 2c and damper 8b connects to room 2d.

Similarly, chamber 7b also includes the other two air-sending openings each equipped with damper 8c and damper 8d. Damper 8c connects to room 2b and damper 8d connects to room 2a.

Each of dampers 8 communicably connects to system controller 10b. Damper controller 32 changes (adjusts) each of the air volumes passing through a corresponding one of the air-sending openings by independently controlling a corresponding one of damper opening degrees.

System controller 10b controls each of the air volumes to be transferred to the corresponding one of rooms from air-conditioned room 18 through the corresponding one of transfer fans 3 (3e and 30 and dampers 8 (8a through 8d).

Specifically, air volume determiner 40 determines each of the air volumes to be transferred to the corresponding one of the rooms according to the humidity of the corresponding one of the rooms obtained by a corresponding one of room humidity sensors 12 and humidity of air-conditioned room 18 obtained by air-conditioned room sensor 15. Each of the air volumes to be transferred to the corresponding one of the rooms is synonymous with "air volume of transfer fan 3" in the first embodiment.

Damper controller 32 changes (adjusts) each of the damper opening degrees of dampers 8 disposed for the corresponding one of the rooms to achieve each of the air volumes determined by air volume determiner 40. Damper controller 32, when each of the air volumes of transfer fan 3e and transfer 3f is not enough, increases each of the air volumes by adjusting the corresponding one of the damper opening degrees of dampers 8. Similarly, damper controller 32, when each of the air volumes of transfer fan 3e and transfer 3f is excessive, reduces each of the air volumes by adjusting the corresponding one of the damper opening degrees of dampers 8.

Behaviors or processes provided by air volume determiner 40 are same as those of fan air volume determining process S200 and an air volume determining process S300.

Chambers 7 are disposed in the configuration of the second embodiment, however, a single chamber 7 may be available. Any number of dampers 8 may be applied according to how much air volume a transfer fan provides or how many rooms a chamber connects to. Each of the rooms in the first and second embodiments assumes to be occupied, however, it is not necessarily occupied and may be a space. A hallway or a kitchen also may be as one of the rooms when the hallway or the kitchen is almost separated from adjacent spaces.

The air-conditioning system according to the present invention is applicable to a single-family residential house or a multi-family residential house such as an apartment. However, if applied to the multi-family residential house, the air-conditioning system is installed per family and each family is not considered as one room.

The air-conditioning system includes both a humidifier and a dehumidifier in the configurations of the first and second embodiments, however, the air-conditioning system may only include the humidifier according to living climate. In such a configuration, an air-conditioned room humidity controller controls only the humidifier to maintain a humidity of an air-conditioned room not lower than a specified minimum humidity. The air-conditioning system controls the minimum humidity and does not control a maximum humidity. In contrast, the air-conditioning system may only include the dehumidifier. In such a configuration, the air-conditioned room humidity controller controls only the dehumidifier to maintain the humidity of the air-conditioned room not greater than a specified maximum humidity. The air-conditioning system controls the maximum humidity and does not control the minimum humidity.

Any reasonable combination of various components included in the configurations of the first and second embodiments may be available as a different embodiment of the present invention.

For example, a configuration of air conditioning system, which combines only the transfer fans applied in the first embodiment with the transfer fans and the dampers applied in the second embodiment, may be applicable.

INDUSTRIAL APPLICABILITY

The air-conditioning system and the air-conditioning system controller according to the present invention are useful as those contributing to a downsized air-conditioned room through efficient humidification and dehumidification.

| REFERENCE MARKS IN THE DRAWINGS | |
|---|---|
| 1 | general residential house |
| 2, 2a, 2b, 2c, 2d | room |
| 3, 3a, 3b, 3c, 3d | transfer fan |
| 4 | outdoor air introducing fan |
| 5, 5a, 5b, 5c, 5d | exhaust fan |
| 6, 6a, 6b, 6c, 6d | circulation fan |
| 7, 7a, 7b | chamber |
| 8, 8a, 8b, 8c, 8d | damper |
| 9 | air conditioner |
| 10, 10b | system controller |
| 11, 11a, 11b, 11c, 11d | room temperature sensor |
| 12, 12a, 12b, 12c, 12d | room humidity sensor |
| 14 | air-conditioned room temperature sensor |
| 15 | air-conditioned room humidity sensor |
| 16 | humidifier |
| 17 | dehumidifier |
| 18 | air-conditioned room |
| 19 | input-output terminal |
| 20, 20b | air-conditioning system |
| 21 | partition board |
| 22 | first space |
| 23 | second space |
| 24 | third space |
| 25 | space-connecting opening |
| 26 | first air supply opening |
| 27 | second air supply opening |
| 28 | first space temperature sensor |
| 29 | first space humidity sensor |
| 30 | second-third space |
| 31 | fan air volume controller |
| 32 | damper controller |
| 40 | air volume determiner |
| 53 | humidity determiner |
| 54 | room target humidity obtainer |
| 55 | air-conditioned room humidity controller |
| 56 | humidity difference comparator |
| 57 | high-low determiner |
| 58 | first space humidity calculator |

The invention claimed is:
1. An air-conditioning system comprising:
a humidifier for humidifying air of an air conditioned room;
a dehumidifier for dehumidifying air of the air conditioned room;
a plurality of transfer fans for transferring air of the air-conditioned room to a plurality of rooms independent from the air conditioned room;
a plurality of dampers each disposed for a corresponding one of the rooms for independently controlling an air volume of air to be transferred to the room by a corresponding one of the transfer fans;

a system controller for controlling the humidifier, the dehumidifier and each of the dampers;

a plurality of room humidity sensors each obtaining a humidity of a corresponding one of the rooms to transmit the humidity to the system controller; and an air-conditioned room humidity sensor for obtaining a humidity of the air-conditioned room to transmit the humidity to the system controller, wherein the system controller includes:

an air-conditioned room humidity controller for controlling at least one of the humidifier and the dehumidifier to maintain the humidity of the air-conditioned room within a specified humidity range defined by a minimum humidity and a maximum humidity;

an air volume determiner for determining an air volume passing through each of the dampers according to the humidity of a corresponding one of the rooms obtained by a corresponding one of the room humidity sensors and the humidity of the air-conditioned room obtained by the air-conditioned room humidity sensor; and a damper controller for controlling the air volume of air to be transferred to each of the rooms passing through a corresponding one of the dampers at the air volume determined by the air volume determiner.

2. The air-conditioning system according to claim 1, wherein the air volume determiner includes:

a humidity determiner for determining whether the humidity of each of the rooms is within the specified humidity range according to the humidity of the corresponding one of the rooms obtained by the corresponding one of the room humidity sensors and the specified humidity range; and a humidity difference comparator for calculating a difference between the humidity of each of the rooms obtained by the corresponding one of the room humidity sensors and the humidity of the air-conditioned room obtained by the air-conditioned room humidity sensor, and the air volume determiner determines the air volume passing through each of the dampers according to the difference in humidity calculated by the humidity difference comparator when the humidity determiner determines the humidity of each of the rooms is out of the specified humidity range.

3. The air-conditioning system according to claim 2, wherein the air volume determiner determines to transfer more air volume passing through each of the dampers to a room determined to have a large humidity difference than a room determined to have a small humidity difference according to the difference in humidity calculated by the humidity difference comparator.

4. The air-conditioning system according to claim 1, wherein the air volume determiner includes:

a humidity determiner for determining whether the humidity of each of the rooms is within the specified humidity range according to the humidity of the corresponding one of the rooms obtained by the corresponding one of the room humidity sensors and the specified humidity range; and a high-low determiner for determining whether the humidity of each of the rooms obtained by the corresponding one of the room humidity sensors is higher or lower than the humidity of the air-conditioned room, and the air volume determiner determines an air volume passing through each of the dampers according to a result determined by the high-low determiner when the humidity determiner determines the humidity of each of the rooms is out of the specified humidity range.

5. The air-conditioning system according to claim 4, wherein the air volume determiner determines to transfer an identical air volume passing through each of the dampers to a room determined to have a humidity higher than the maximum humidity and a room determined to have a humidity lower than the minimum humidity when the high-low determiner determines both the room determined to have the humidity higher than the maximum humidity and the room determined to have the humidity lower than the minimum humidity are present.

6. The air-conditioning system according to claim 4, wherein the air volume determiner includes:

a humidity difference comparator for calculating a difference between the humidity of each of the rooms obtained by the corresponding one of the room humidity sensors and the humidity of the air-conditioned room obtained by the air-conditioned room humidity sensor, and the air volume determiner determines an air volume passing through each of the dampers according to the difference calculated by the humidity difference comparator when the high-low determiner determines both the room determined to have the humidity higher than the maximum humidity and the room determined to have the humidity lower than the minimum humidity are present.

7. The air-conditioning system according to claim 6, wherein the air volume determiner determines to transfer more air volume passing through each of the dampers to a room determined to have a small humidity difference than a room determined to have a large humidity difference according to the difference calculated by the humidity difference comparator when the high-low determiner determines both the room determined to have the humidity higher than the maximum humidity and the room determined to have the humidity lower than the minimum humidity are present.

8. The air-conditioning system according to claim 1, wherein the air-conditioned room includes:

a first space having an air supply opening;

the dehumidifier for dehumidifying air of the first space;

a second space communicated with the first space and independently disposed downstream of the first space of the air-conditioned room;

an air conditioner for conditioning air of the second space; and the transfer fans for transferring air conditioned by the air conditioner out of the air-conditioned room.

9. The air-conditioning system according to claim 8, comprising:

a third space communicated with the first space and independently disposed downstream of the first space; and the humidifier for humidifying air of the third space.

10. The air-conditioning system according to claim 9, wherein the second space is combined with the third space.

11. The air-conditioning system according to claim 9, wherein the second space is disposed downstream of the first space and upstream of the third space.

12. An air-conditioning system comprising:

a humidifier for humidifying air of an air conditioned room;

a plurality of transfer fans for transferring air of the air-conditioned room to a plurality of rooms independent from the air conditioned room;
a plurality of dampers each disposed for a corresponding one of the rooms for independently controlling an air volume of air to be transferred to the room by a corresponding one of the transfer fans;
a system controller for controlling the humidifier, a dehumidifier and each of the dampers;
a plurality of room humidity sensors each obtaining a humidity of a corresponding one of the rooms to transmit the humidity to the system controller; and
an air-conditioned room humidity sensor for obtaining a humidity of the air-conditioned room to transmit the humidity to the system controller,
wherein the system controller includes:
an air-conditioned room humidity controller for controlling the humidifier to maintain the humidity of the air-conditioned room within a specified humidity range not lower than a specified minimum humidity;
an air volume determiner for determining an air volume passing through each of the dampers according to the humidity of a corresponding one of the rooms obtained by a corresponding one of the room humidity sensors and the humidity of the air-conditioned room obtained by the air-conditioned room humidity sensor; and
a damper controller for controlling the air volume of air to be transferred to each of the rooms passing through a corresponding one of the dampers at the air volume determined by the air volume determiner.

13. An air-conditioning system comprising:
a dehumidifier for dehumidifying air of an air conditioned room;
a plurality of transfer fans for transferring air of the air-conditioned room to a plurality of rooms independent from the air conditioned room;
a plurality of dampers each disposed for a corresponding one of the rooms for independently controlling an air volume of air to be transferred to the room by a corresponding one of the transfer fans;
a system controller for controlling a humidifier, the dehumidifier and each of the dampers;
a plurality of room humidity sensors each obtaining a humidity of a corresponding one of the rooms to transmit the humidity to the system controller; and
an air-conditioned room humidity sensor for obtaining a humidity of the air-conditioned room to transmit the humidity to the system controller,
wherein the system controller includes:
an air-conditioned room humidity controller for controlling the humidifier to maintain the humidity of the air-conditioned room within a specified humidity range not greater than a specified maximum humidity;
an air volume determiner for determining an air volume passing through each of the dampers according to the humidity of a corresponding one of the rooms obtained by a corresponding one of the room humidity sensors and the humidity of the air-conditioned room obtained by the air-conditioned room humidity sensor; and
a damper controller for controlling the air volume of air to be transferred to each of the rooms passing through a corresponding one of the dampers at the air volume determined by the air volume determiner.

14. An air-conditioning system controller,
wherein the air-conditioning system controller controls:
a humidifier for humidifying air of an air conditioned room;
a dehumidifier for dehumidifying air of the air conditioned room; and
a plurality of dampers for independently controlling an air volume of air to be transferred by each of a plurality of transfer fans from the air-conditioned room to a corresponding one of a plurality of rooms independent from the air-conditioned room, and
the air-conditioning system controller includes:
an air-conditioned room humidity controller for controlling at least one of the humidifier and the dehumidifier to maintain a humidity of the air-conditioned room within a specified humidity range defined by a minimum humidity and a maximum humidity;
an air volume determiner for determining an air volume of air passing through each of the dampers according to a humidity of a corresponding one of the rooms and the humidity of the air-conditioned room; and
a damper controller for controlling an air volume of air passing through each of the dampers to be transferred to a corresponding one of the rooms at the air volume determined by the air volume determiner.

15. An air-conditioning system controller,
wherein the air-conditioning system controller controls:
a humidifier for humidifying air of an air-conditioned room; and
a plurality of dampers for independently controlling an air volume of air to be transferred by a corresponding one of a plurality of transfer fans from the air-conditioned room to a corresponding one of a plurality of rooms independent from the air-conditioned room, and
the air-conditioning system controller includes:
an air-conditioned room humidity controller for controlling the humidifier to maintain a humidity of the air-conditioned room within a specified humidity range not lower than a specified minimum humidity;
an air volume determiner for determining an air volume of air passing through each of the dampers according to a humidity of a corresponding one of the rooms and the humidity of the air-conditioned room; and
a damper controller for controlling an air volume of air passing through each of the dampers to be transferred to a corresponding one of the rooms at the air volume determined by the air volume determiner.

16. An air-conditioning system controller,
wherein the air-conditioning system controller controls:
a dehumidifier for dehumidifying air of an air-conditioned room; and
a plurality of dampers for independently controlling an air volume of air to be transferred by a corresponding one of a plurality of transfer fans from the air-conditioned room to a corresponding one of a plurality of rooms independent from the air-conditioned room, and
the air-conditioning system controller includes:
an air-conditioned room humidity controller for controlling the dehumidifier to maintain a humidity of the air-conditioned room within a specified humidity range not greater than a specified maximum humidity;
an air volume determiner for determining an air volume of air passing through each of the dampers according to a humidity of a corresponding one of the rooms and the humidity of the air-conditioned room; and
a damper controller for controlling an air volume of air passing through each of the dampers to be transferred to a corresponding one of the rooms at the air volume determined by the air volume determiner.

* * * * *